United States Patent
Rousseau et al.

[15] 3,682,964
[45] Aug. 8, 1972

[54] SPIRO BENZOCYCLANE ACETIC ACID COMPOUNDS

[72] Inventors: Genevieve Rousseau, Paris; Andres Allais, Les Lilas; Andre Poittevin, Vaires-sur-Marne, all of France

[73] Assignee: Roussel Uclof, Paris, France

[22] Filed: Aug. 31, 1970

[21] Appl. No.: 68,530

[52] U.S. Cl. ......260/327 TH, 260/340.9, 260/345.7, 260/345.8, 260/465 D, 260/465 F, 260/465 G, 260/465 R, 260/469, 260/473 F, 260/515 A, 260/515 P, 260/515 R, 260/516, 260/520, 260/558 D, 260/558 R, 260/559 R, 260/590, 424/275, 424/278, 424/283, 424/308, 424/317

[51] Int. Cl. ......A61k 27/00, C07d 65/04, C07d 7/04

[58] Field of Search..............................260/327 TH, 260/345.7, 345.8, 473 F, 260/469, 515 A, 520, 515 R

[56] References Cited

UNITED STATES PATENTS 3,534,045  10/1970  von Strandtmann et al..........................260/289

*Primary Examiner*—Henry R. Jiles
*Assistant Examiner*—Cecilia M. Shurko
*Attorney*—Hammond & Littell

[57] ABSTRACT

Novel spiro benzocyclane acetic acid compounds of the formula

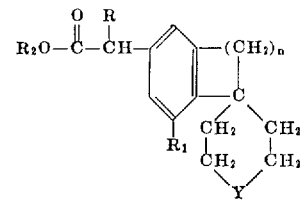

wherein R is selected from the group consisting of hydrogen and linear and branched alkyl of one to four carbon atoms, $R_1$ is selected from the group consisting of hydrogen, chlorine, trifluoromethyl and lower alkoxy, Y is selected from the group consisting of methylene, oxygen and sulfur, $n$ is 2, 3 or 4 and $R_2$ is selected from the group consisting of hydrogen, substituted or unsubstituted alkyl of one to six carbon atoms and cation of non-toxic, pharmaceutically acceptable mineral and organic bases, processes for their preparation and novel intermediates. The compounds of formula I have analgesic and anti-inflammatory properties.

14 Claims, No Drawings

SPIRO BENZOCYCLANE ACETIC ACID COMPOUNDS

OBJECTS OF THE INVENTION

It is an object of the invention to provide the novel spiro benzycyclane acetic acid compounds of formula I.

It is another object of the invention to provide novel processes for the preparation of the compounds of formula I.

It is a further object of the invention to provide novel intermediate products for the compounds of formula I.

It is an additional object of the invention to provide novel anti-inflammatory and analgesic compositions and to provide a novel method of relieving pain and inflammation in warm-blooded animals.

These and other objects and advantages of the invention will become obvious from the following detailed description.

THE INVENTION

The novel compounds of the invention are racemic or optically active isomers

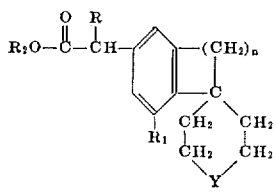

wherein R is selected from the group consisting of hydrogen and linear and branched alkyl of one to four carbon atoms, $R_1$ is selected from the group consisting of hydrogen, chlorine, trifluoromethyl and lower alkoxy, Y is selected from the group of methylene, oxygen and sulfur, n is 2, 3, or 4 and $R_2$ is selected from the group consisting of hydrogen, substituted or unsubstituted alkyl of one to six carbon atoms and cation of non-toxic, pharmaceutically acceptable mineral and organic bases.

Examples of suitable compounds of formula I are spiro (cyclohexane-1,1'-indane)-5'-acetic acid, dl α-methyl spiro (cyclohexane-1,1'-indane)-5'-acetic acid 3',4'-dihydro-spiro [cyclohexane-1,1'-(2'H)-naphthalene]-6'-acetic acid, dl α-methyl-3',4'-dihydro spiro [cyclohexane-1,1'-(2'H)-naphthalene]-6'-acetic acid, 2,3,5,6-tetrahydro spiro (pyran-4,1'-indane)-5'-acetic acid, dl α-methyl-2,3,5,6-tetrahydro spiro (pyran- 4,1'-indane)-5'-acetic acid; 2,3,5,6-tetrahydro spiro (thiapyran-4,1'-indane)-5'-acetic acid, dl α-methyl-2,3,5,6-tetrahydro spiro (thiapyran-4,1'-indane)-5'-acetic acid, spiro (cyclohexane-1,1'-indane)-7'-chloro-5'-acetic acid, spiro (cyclohexane-1,1'-indane)-7'-trifluoromethyl-5'-acetic acid, spiro(cyclohexane-1,1'-indane)-7'-methoxy-5'-acetic acid, spiro (cyclohexane-1,1'-indane)-7'-ethoxy-5'-acetic acid, 2,3-dihydroxypropyl ester of spiro (cyclohexane-1,1'-indane)-5'-acetic acid, 2,3-dihydroxypropyl ester of dl α-methyl spiro (cyclohexane-1,1'-indane)-5'-acetic acid, [4 -(2,2-dimethyl-1,3-dioxolane)]methyl ester of spiro (cyclohexane-1,1'-indane)-5'-acetic acid and [4-(2,2-dimethyl-1,3-dioxolane)] methyl ester of dl α-methyl spiro (cycohexane-1,1'-indane)-5'-acetic acid.

The compounds are considered to be derivatives of phenylacetic acid substituted in the meta and para positions with respect to the acetic acid chain. French Pat. No. 1,481,687 and BSM Pat. No. 6632 M describe compounds having the definition of this genus but in this precise case, the substituent in the meta position is of a small size or does not modify the conformation of the molecule as with a halogen, amine or hydroxyl. On the contrary, derivatives of phenylacetic acid substituted at the same time in the meta and para positions with voluminous alkylene are not known and it is not known from the prior literature what the effect of such a radical would have on the pharmaceutical properties. One could have expected a longer or much smaller attenuation of the anti-inflammatory properties of the basic molecule or its analgesic properties.

It has been found that the anti-inflammatory properties of the compounds of formula I are not sensibly different from those products of the literature but their analgesic properties are very much higher. The anti-inflammatory properties are on a level with the most active anti-inflammatory agents on the market such as Ibuprofen or (4'-cyclohexylchlorophenyl)-α-methyl acetic acid. The analgesic properties are very much superior to the known products of this family.

For the following discussion of the novel processes for the preparation of the compounds of formula I, the compounds will be considered as being two separate categories, Ia wherein Y is methylene or oxygen and Ib wherein Y is sulfur.

The esters and salts of the acids of formula I can be made from the free acid in the usual way. For example, the free acid can be reacted with a mineral base such as an alkali metal hydroxide or carbonate or with an organic base such as triethylamine. The free acid may also be esterified with an esterification reactant such as diazomethane or methanol in the presence of an acid agent or a dehydrating agent.

The α-glycerol esters of the acids can be prepared by (a) changing the acid of formula I into a functional derivative thereof such as its acid chloride by known means, and then reacting the said derivative with a ketonide of glycerol and after acid hydrolysis of the resulting ketonide of α-glycerol ester to obtain the desired α-glycerol ester or (b) subjecting a lower alkyl ester of formula I to transesterification with a ketonide of glycerol in the presence of an alkaline agent such as sodium, sodium amide or sodium hydride.

The novel process of the invention to produce a compound of formula Ia comprises reacting an O-$R_1$-p-tolyl magnesium halide with a lower alkyl cyanacetate of the formula

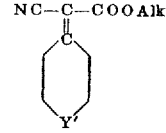

II wherein Alk is a lower alkyl and Y' is a methylene or oxygen to obtain a lower alkyl α-cyanoacetate of the formula

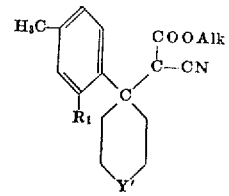

III subjecting the latter to hydrolysis to form an acetic acid derivative of the formula

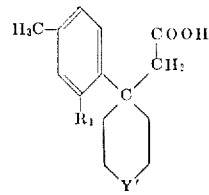

IV treating the latter with first an alkaline base and then a halogenation agent to obtain an acid of the formula

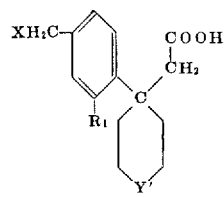

V wherein X is a halogen such as chlorine or bromine, transforming the latter with an alkali metal cyanide into a cyanomethyl derivative of the formula

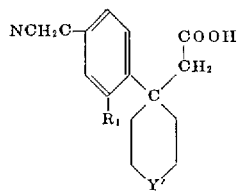

VIa then, if desired, the acetic acid chain is elongated with a homologation agent to obtain a compound of the formula

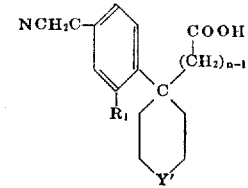

VIb treating the latter with a cyclization agent to form an an acetamide of the formula

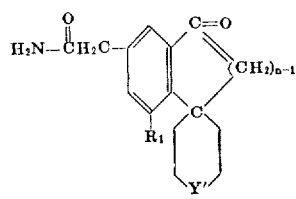

VII which is treated with a strong acid or base to obtain the acetic acid derivative of the formula

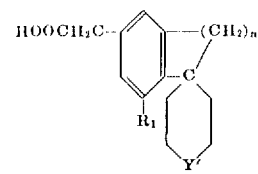

VIII reacting the latter with a reducing agent to obtain a spiro benzocyclane acetic acid of the formula

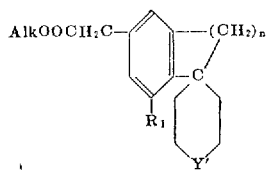

Ia which can be reacted with an appropriate esterification agent to form an ester of the formula

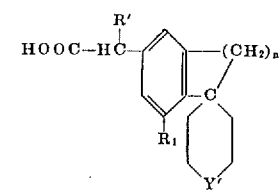

IX reacting the latter with an alkaline agent selected from the group consisting of alkali metal hydride, alkali metal amide and alkali metal derivatives of dialkylamide followed by treatment with an alkylation agent selected from the group consisting of R'X, R''SO$_3$R', ArSO$_3$R' and SO$_2$(OR')$_2$ wherein X is chlorine, bromine or iodine, R' is a branched or linear alkyl of one to four atoms, R'' is lower alkyl and Ar is an aromatic to obtain a compound of the formula

X and optionally saponifying the latter.

In a preferred embodiment of the said process, the hydrolysis of the alkyl α-cyanoacetate of formula III is effected with an alkaline base such as potassium hydroxide in a polyol such as ethylene glycol or an ether of an aliphatic polyol. The halogenation agent may be N-bromo or N-chloro succinimide or chlorine or bromine. The alkali metal cyanide necessary for reaction with the halomethyl of formula V is preferably potassium or sodium cyanide.

For the eventual enlargement of the acetic acid chain, the method of Arndt-Eistert may be used which consists of treating the cyanomethyl derivative of formula VIa with thionyl chloride, then reacting the resulting acid chloride with diazomethane to form a diazoketone which decomposes with silver oxide to obtain a higher homolog of the cyanomethyl derivative of formula VIa. In order to obtain a derivative still containing one more carbon atom one repeats the described homologation reactions again on the obtained homolog VI b.

The cyclization acid may be polyphosphoric acid or sulfuric acid and the reducing agent is preferably hydrogen in the presence of palladized charcoal and the hydrogenation reaction is effected in the presence of perchloric acid. The Wolff-Kishner method may also be used for the reduction as well as zinc and hydrochloric acid.

The preferred means of obtaining the α-alkyl derivative consists of reacting the methyl ester of the acid of Ia with lithium dialkylamide such as lithium diethyl amide, the reaction being preferably carried out in a mixture of solvents of strong dielectric constant such as hexamethyl phosphorotriamide and tetrahydrofuran, then with an alkyl iodide of the formula IR'. The alkaline agent may be sodium hydride, sodium amide and in an organic media such as dimethylformamide or a benzene-ether mixture. The saponification of the ester of the acid of formula X can be effected by known methods such as the action of sodium hydroxide or potassium hydroxide in an aqueous alcoholic media.

Certain steps of the process described above can be modified. The intermediate compound of the formula

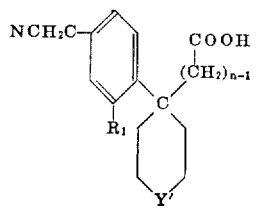

VIb can be hydrolyzed to obtain a compound of the formula

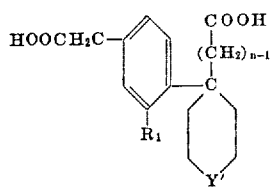

XI and the latter can be treated with an acid cyclization agent to obtain an acetic acid derivative of the formula

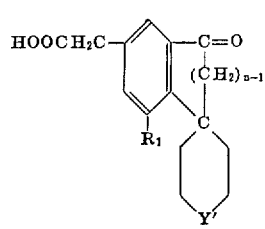

VIII

It is also possible to reduce with a mixed hydride the compound of formula VIII to obtain a hydroxylated compound of the formula

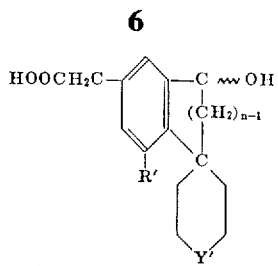

XII which can be treated with a dehydration agent to obtain a compound of the formula

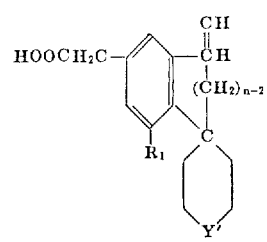

XIII which is then treated with a hydrogenation agent in the presence of a catalyst to obtain a spiro benzocyclane acetic acid of the formula

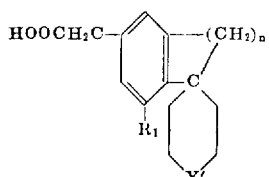

Ia

It is also possible to produce the higher homolog, if desired, with the Arndt-Eistert method from an acetic acid of the formula

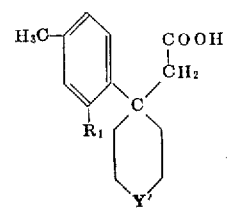

IV to form a compound of the formula

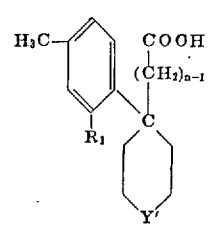

IVa reacting the latter with a cyclization acid to obtain a compound of the formula

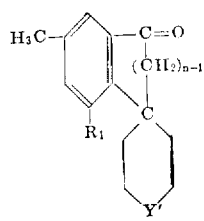

XIV treating the latter with a halogenation agent to obtain a compound of the formula

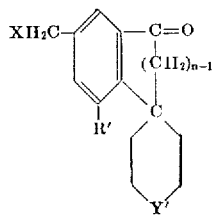

XV reacting the latter with an alkali metal cyanide to obtain a cyanomethyl compound of the

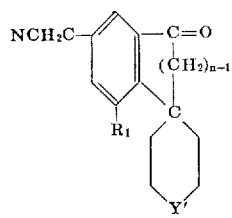

XVI hydrolyzing the latter to obtain a compound of the formula

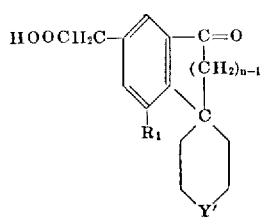

VIII

It is also possible to react the acetic acid derivative of formula IVa with a halogenation agent to obtain a compound of the formula

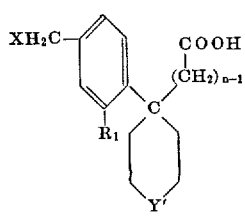

V' and reacting the latter with an acid cyclization agent to obtain a compound of formula XV which can be treated as described above.

The process of the invention to prepare the compounds of formula I comprises reacting a lower alkyl cyanacetate of the formula

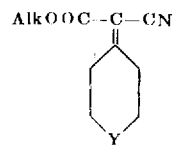

XVII wherein Y and Alk have the above definitions with a ketal of $\alpha$-$R_1$ -4-acetylphenyl magnesium bromide of the formula

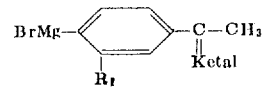

XVIII to obtain a compound of the formula

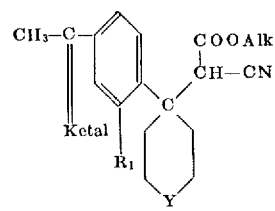

XIX hydrolyzing the latter with a basic agent and then hydrolyzing the ketal function and decarboxylating with an acid agent to obtain a compound of the formula

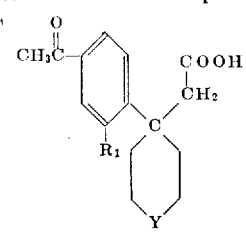

XX enlarging, if desired, the acetic acid chain of the compound with a homologation agent to obtain a compound of the formula

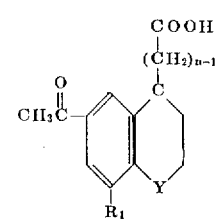

XXI subjecting the latter according to the Willgerodt and Kindler reaction to the action of sulfur in an anhydrous medium in the presence of a secondary amine of the formula wherein $R_4$ and $R_5$ are lower alkyl or together with the nitrogen to which they are attached from a heterocyclic and treating the resulting thiocarbonyl of the formula

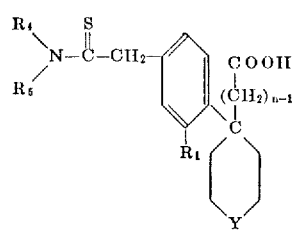

XXII with a basic agent to obtain an acetic acid derivative of the formula

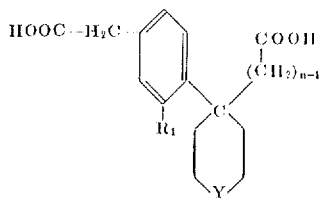
XXIII reacting the latter with a cyclization acid agent to obtain an acetic acid derivative of the formula

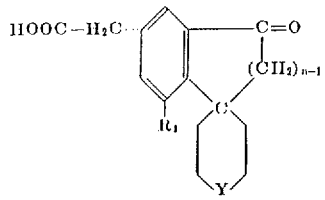
XXIV treating the latter with a suitable reducing agent to obtain a spiro benzocyclane acetic acid of the formula

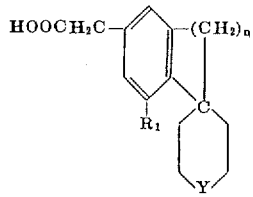
I'a which if desired can be α-alkylated, after esterification with an appropriate agent, by reaction with an alkaline agent selected from the group consisting of alkali metal hydrides, alkali metal amides and alkali metal dialkylamides then with an alkylation agent selected from the group consisting of R'X, R'' SO$_3$R', ArSO$_3$R' and SO$_2$(OR')$_2$ wherein X, R'' and Ar have the above definitions to form an alkyl ester of acid of the formula

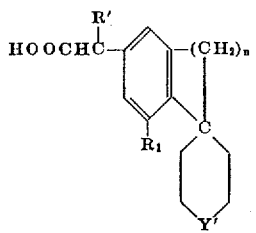
I'b which can be saponified by known methods.

In a preferred mode of this process of the invention, the ketal group of the compound of formula XVIII is diethylene ketal obtained by reacting 2-(m-R$_1$-p - bromophenyl)-2-methyl-1,3-dioxolane with magnesium in tetrahydrofuran. The basic agent reacted with the ketal of formula XIX is preferably an alkali metal hydroxide such as potassium hydroxide or sodium hydroxide and the reaction is in an aqueous medium, preferably in the presence of diethylene glycol at a sufficiently high temperature to decompose the ammonium salt obtained by hydrolysis of the nitrile to the acid and ammonia.

The acid agent used to treat the hydrolysis product of the basic treatment is a strong acid such as hydrochloric acid, perchloric acid or sulfuric acid. The elongation or enlargement of the acetic acid chain may be effected by treating the compound of formula XX with the method of Arndt-Eistert described above.

The secondary amine used in the Willgerodt and Kindler reaction is notably dimethylamine, diethylamine or morpholine. The use of morpholine allows the use of atmospheric pressure and the acid catalyst may be p-toluene sulfonic acid which is added to the reaction mixture. The basic agent used to react with the compound of formula XXII is preferably an alcali-metal hydroxide, e.g. sodium or potassium hydroxide, in an organic solvent such as a lower alkanol (e.g. methanol or ethanol).

The salt thus obtained is then treated with a strong acid to form the free acid.

The cyclization is preferably effected with polyphosphoric acid or sulfuric acid. The reducing agent is preferably that used with the Wolff-Kishner method or zinc and hydrochloric acid. When Y is methylene or oxygen, the reducing agent can be hydrogen in the presence of a catalyst such as palladized charcoal and is effected in the presence of perchloric acid. The α-alkylation of the compound of formula I'a is preferably effected as indicated for the alkylation of the compound of formula Ia.

The lower alkyl 4-tetrahydrothiapyranylidene cyanacetate starting materials are obtained by a method analogous to that of Rice, J. Med. Chem., Vol. 6 (1963), p.388 for preparing ethyl 4-tetrahydrothiapyranylidene cyanacetate. The lower alkyl 4-tetrahydropyranylidene cyanacetates can be prepared in an analogous fashion to that described in the examples for the preparation of ethyl 4-tetrahydropyranylidene cyanacetate.

It is interesting to note that in addition to the compounds of formula I, certain intermediates produced in the process also possess anti-inflammatory and analgesic properties, namely the indane derivatives having a double bond in the 2',3'-position; the indane derivatives having a 3' ketonic oxygen; the indane derivatives having a 3'-hydroxyl; and the naphthalenic derivatives having a 4'-ketonic oxygen.

The novel analgesic and anti-inflammatory compositions of the invention are comprised of an effective amount of a compound of formula I and a major amount of a pharmaceutical carrier. The compositions may be in the form of injectable solutions or suspensions in ampoules or multiple dose flacons or in the form of tablets, coated tablets, capsules, suppositories, lotions, creams or pomades prepared in the usual manner. The individual dose for adults is 5 to 50mg per dose and 10 to 200mg per day depending upon the method of administration and the age of the individual.

The method of reducing inflammation and pain in warm-blooded animals comprises administering an effective amount of a compound of formula I. The compounds may be administered orally, rectally, parenterally, topically or permucuously. The usual dosage is 0.1 to 5 mg/Kg per day depending upon the specific mode of administration.

In the following examples there are described several preferred embodiments to illustrate the invention. However, it should be understood that the invention is not intended to be limited to the specific embodiments.

EXAMPLE 1

PREPARATION OF Spiro (cyclohexane-1,1'-indane)-5'-Acetic Acid

STEP A : Ethyl α-cyano-1-(p-tolyl)-cyclohexaneacetate

A solution of 29 gm of the ethyl ester of cyclohexylidene cyanoacetic acid [described in J. Org. Vol. 27 (1962), p. 3507] in 50 cc of benzene was progressivly added to 200 cc of an ethereal solution of 0.72N p-tolyl magnesium bromide and after the addition of 50 cc of benzene, the ether was removed by distillation. The mixture was refluxed with agitation for 15 hours and after cooling, the reaction mixture poured over ice. The mixture was acidified with an aqueous solution of 2N hydrochloric acid and the organic phase was decanted off. The aqueous phase was extracted with ether and the organic phases were combined, washed with water, dried and concentrated to dryness. The residue was rectified to obtain 20 gm of ethyl α-cyano-1-(p-tolyl)-cyclohexaneacetate. A fraction of the product was rectified again and had a boiling point of 145° C at 0.2 mm Hg.

Analysis: $C_{18}H_{23}NO_2$; molecular weight = 285.37
Calculated: %C 75.75 % H 8.12 % N 4.91
Found: % C 75.7 % H 8.1 % N 5.2

As far as is known, this compound is not described in the literature.

STEP B: 1-(p-tolyl)cyclohexaneacetic acid

Fourteen grams of ethyl α-cyano-1-(p-tolyl)-cyclohexaneacetate were suspended in a mixture of 40 cc of ethylene glycol and 0.2 cc of water and 8.8 gm of potassium hydroxide and the reaction mixture was heated at 200° C with stirring for 16 hours. After cooling, the mixture was poured into water and the neutral fraction was removed by extraction with methy-lene chloride. The aqueous phase was acidified with an aqueous solution of concentrated hydrochloric acid and was then extracted with methylene chloride. The methylene chloride phase was washed with water, dried and concentrated to dryness by distillation under reduced pressure. The residue was crystallized from isopropyl ether to obtain 9.25 gm of 1-(p-tolyl)-cyclohexaneacetic acid melting at 118° C. A portion of the product, purified by sublimation, melted at 118° C.

Analysis: $C_{15}H_{20}O_2$; molecular weight = 232.31
Calculated: % C 77.55 % H 8.68
Found: % C 77.4 % H 8.8

As far as is known, this product is not described in the literature.

STEP C: 1-(p-bromomethylphenyl)cyclohexaneacetic acid

A mixture of 24 gm of 1-(p-tolyl)-cyclohexaneacetic acid, 240 cc of carbon tetrachloride, 20.4 gm of N-bromosuccinimide and 0.3 gm of 2,2'-azo-bis-(2-methylpropionitrile) was refluxed for 45 minutes and after cooling, the mixture was filtered to remove the insoluble residue. The filtrate was concentrated to dryness and the residue was crystallized from isopropyl ether to obtain 27 gm of 1-(p-bromomethylphenyl)cyclohexaneacetic acid melting at 125-130° C. A sample of the product, purified by crystallization from isopropyl ether, melted at 130° C.

Analysis: $C_{15}H_{19}BrO_2$; molecular weight = 311.2
Calculated: % C 57.89 % H 6.15 % Br 25.68
Found: % C 57.9 % H 6.0 % Br 25.5

As far as is known, this compound is not described in the literature.

STEP D: 1-(p-cyanomethylphenyl)-cyclohexaneacetic acid 12.80 gm of sodium cyanide were dissolved in a mixture of 70 cc ofdioxane and 20 cc of water and the reaction mixture was heated to 105° C. A solution of 27 gm of 1-(p-bromomethylphenyl)cyclohexane acetic acid in 80 cc of dioxane was added thereto over 35 minutes and the mixture was heated for another 5 minutes. After cooling, the mixture was poured into water and the neutral fraction was removed by extraction with methylene chloride. The methylene chloride extracts were washed with water and the wash water and the principal aqueous phase were combined and made acidic by the addition of aqueous concentrated hydrochloric acid. The aqueous phase was extracted with methylene chloride and the organic extracts were washed with water, dried and concentrated to dryness by distillation under reduced pressure. The residue was crystallized from isopropyl ether to obtain 13.5 gm of 1-(p-cyanomethylphenyl) cyclohexane acetic acid melting at 132° C. A sample of the product, purified by crystallization from ethyl ether, melted at 134° C.

Analysis: $C_{16}H_{19}NO_2$; molecular weight = 257.32
Calculated: % C 74.68 % H 7.44 % N 5.44
Found: % C 74.6 % H 7.3 % N 5.4

As far as is known, this compound is not described in the literature.

STEP E: 3'-oxospiro- (cyclohexane-1,1'-indane)-5'-acetamide

One gram of 1-(p-cyanomethylphenyl)-cyclohexaneacetic acid was suspended in 10 gm of polyphosphoric acid and the mixture was stirred for 1 ½ hours under a nitrogen atmosphere at 140° C. After cooling, the mixture was added to 200 cc of water and an excess of sodium bicarbonate. The mixture was extracted with methylene chloride and the organic phase was washed with water, dried over magnesium sulfate, filtered and was distilled to dryness in vacuo. The residue was crystallized from 5 cc of ethyl acetate to obtain 750 mg (75% yield) of 3'-oxospiro-(cyclohexane-1,1'-indane)-5'-acetamide melting at 175° C. For analysis, the product was crystallized from hot and cold ethyl acetate.

Analysis: $C_{16}H_{19}NO_2$; molecular weight = 257.34
Calculated: %C 74.68 %H 7.44 %N 5.44
Found: %C 74.6 %H 7.4 %N5.5

As far as is known, this compound is not described in the literature.

STEP F: 3'-oxospiro(cyclohexane-1,1'-indane)-5'-acetic acid

A suspension of 750 mg of 3'-oxospiro (cyclohexane-1,1'-indane)5'-acetamide, 1.5 gm of potassium hydroxide in 7.5 cc of ethyleneglycol and 0.15 cc of water was stirred for 15 minutes at 180° C and after cooling, it was added to 100 cc of water. 3cc of hydrochloric acid were added thereto and the mixture was extracted with methylene chloride. The organic phase was dried over magnesium sulfate, filtered and distilled to dryness in vacuo. The residue was sublimated to obtain 550 mg (73 percent yield) of 3'-oxospiro (cyclohexane-1,1'-indane)-5'-acetic acid melting at 60° C and then at 124° C. For analysis, the product, upon crystallization from iso-propyl ether, melted at 124° C.

Analysis: $C_{16}H_{18}O_3$; molecular weight = 258.3
Calculated: % C 74.39 % H 7.02
Found: % C 74.1 % H 6.8

As far as is known, this compound is not described in the literature.

STEP G: Spiro (cyclohexane-1,1'-indane)-5-acetic acid 0.500 gm of 3'-oxospiro (cyclohexane -1,1'-indane)-5'-acetic acid were dissolved in a mixture of 5 cc of acetic acid and 0.1 cc of an aqueous solution of perchloric acid (density = 1.67) and 0.500 gm of palladium on charcoal (Degussa type E 10/0) were added thereto. The mixture was stirred under a hydrogen atmosphere until absorption stopped. 117 cc of hydrogen was absorbed in 30 minutes and then the catalyst was removed by filtration. The mixture was concentrated by distillation under reduced pressure and the residue was dissolved in methylene chloride. The resulting solution was washed with an aqueous sodium bicarbonate solution and the neutral fraction was removed by extraction with methylene chloride. The alkaline aqueous phase was made acidic with a concentrated aqueous solution of hydrochloric acid and the acid aqueous phase was extracted with methylene chloride. The said organic phase was washed with water, dried and concentrated to dryness by distillation under reduced pressure. The residue was crystallized from n-pentane to obtain 0.400 gm of spiro (cyclohexane-1,1'-indane)5'-acetic acid melting at 75° C. A sample of the product, after crystallization from n-pentane, melted at 75° C.

Analysis: $C_{16}H_{20}O_2$; molecular weight = 244.32
Calculated % C 78.65 % H 8.25
Found: % C 78.5 % H 8.3

U. V. Spectrum (ethanol):

| | |
|---|---|
| Inflexion towards 214 m$\mu$ | $E_{1cm}^{1\%} = 383$ |
| Inflexion towards 224 m$\mu$ | $E_{1cm}^{1\%} = 239$ |
| Max. at 263 m$\mu$ | $E_{1cm}^{1\%} = 37$ |
| Max. at 268–269 m$\mu$ | $E_{1cm}^{1\%} = 53.8$ |
| Max. at 270–271 m$\mu$ | $E_{1cm}^{1\%} = 54.3$ |
| Max. at 277 m$\mu$ | $E_{1cm}^{1\%}$ 69 |

As far as is known, this compound is not described in the literature.

EXAMPLE II

PREPARATION OF 3'-oxospiro (cyclohexane-1,1'-indane) 5'-acetic acid
STEP A: 1-(p-carboxymethylphenyl)cyclohexaneacetic acid 2.5 gm of 1-(p-cyanomethylphenyl) cyclohexaneacetic acid (prepared as in Step D of ExampleI) were suspended in a solution of 5 gm of potassium hydroxide in 25 cc of ethylene-glycol and 0.5 cc of water and the reaction mixture was heated at 200° C for 1 hour with stirring. After cooling, water was added thereto and the reaction mixture was acidified with a concentrated aqueous hydrochloric acid. The aqueous phase was extracted with methylene chloride and the organic extracts were dried and concentrated to dryness under reduced pressure. The residue was crystallized from isopropyl ether to obtain 2.4 gm of 1-(p-carboxymethyl-phenyl)-cyclohexaneacetic acid melting at 148° C. A sample of the product after purification by crystallization from aqueous methanol (1-1) and then from isopropyl ether melted at 148° C.
Analysis: $C_{16}H_{20}O_4$; molecular weight = 276.32
Calculated: %C 69.54 % H 7.30
Found: %C 69.5 % H 7.5

As far as is known, this compound is not described in the literature.

STEP B: 3'-oxospiro(cyclohexane-1,1'-indane)-5'-acetic acid 12.5 gm of 1(p-carboxymethyl-phenyl)cyclohexaneacetic acid were suspended under a nitrogen atmosphere in 125 gm of polyphosphoric acid and the mixture was heated with stirring at 140° C for 1 hour. After cooling, water was added followed by sufficient sodium bicarbonate to make the mixture alkaline. The neutral fraction was removed by extraction with methylene chloride and the aqueous phase was acidified by addition of concentrated aqueous hydrochloric acid. The aqueous phase was extracted methylene chloride and the combined methylene chloride phases were washed with water, dried and concentrated to dryness by distillation under reduced pressure. The residue was crystallized from isopropyl ether to obtain 7.8 gm of 3'-oxo-spiro (cyclohexane-1,1'-indane)-5'-acetic acid identical to the product of Step F in Example I.

EXAMPLE III

STEP A: 3'$\xi$-hydroxyspiro (cyclohexane-1,1'-indane)-5'-acetic acid 7.7 gm of 3'-oxospiro (cyclohexane-1,1'-indane)-5'-acetic acid (obtained as in Step F of Example I) were dis-solved in 70 cc of ethanol and 7 cc of water and then 7.7 gm of potassium borohydride were added thereto with stirring while maintaining an internal temperature of 30°–32° C. The mixture was stirred for 2 ½ hours at 22° C and then 500 cc of water were added thereto followed by 25 cc of hydrochloric acid. The mixture was extracted with methylene chloride and the organic extracts were washed with water, dried over magnesium sulfate, filtered and evaporated to dryness in vacuo. The residue was crystallized from 50 cc of isopropyl ether, was vacuum filtered, washed with isopropyl ether and dried to obtain 7.2 gm (93% yield) of 3'$\xi$-hydroxyspiro (cyclohexane-1,1'-indane)-5'-acetic acid melting at 120° C. For analysis, the product was crystallized from hot and cold ether and the melting point was unchanged.
Analysis: $C_{16}H_{20}O_3$; molecular weight = 260.32
Calculated: % C 73.82 %H 7.74
Found: % C 73.9 %H 7.7
IR SPECTRUM:
Presence of alcoholic OH at 3,581 cm$^{-1}$ and presence of acid.

As far as is known, this compound is not described in the literature.

STEP B: Spiro (cyclohexane-1,1'-indene)-5'-acetic acid

Three grams of 3'$\xi$-hydroxyspiro (cyclohexane-1,1'-indane)-5'-acetic acid were dissolved in 90 cc of benzene and then 10 cc of benzene were distilled off. Six hundred milligrams of p-toluene sulfonic acid were added to the solution and 50 cc of solvent were distilled off. The mixture was cooled to 20° C and after the addition of 50 cc of water, the mixture was extracted with ether. The ether phases were washed with water, dried over magnesium sulfate, filtered and distilled to dryness in vacuo. The residue was crystallized from 10 cc of n-pentane, was vacuum filtered and washed with n-pentane to obtain 2.52 gm (90 percent yield) of spiro (cyclohexane-1,1'-indene)-5'-acetic acid melting at 100° C. For analysis, the product was crystal-lized from hot and cold isopropyl ether and the melting point was unchanged.

Analysis: $C_{16}H_{18}O_2$; molecular weight = 242.30
Calculated: % C 79.31 % H 7.49
Found: % C 79.4 % H 7.3

U V Spectrum (ethanol):

| | |
|---|---|
| Inflex. towards 217 mμ | $E_{1cm}^{1\%} = 1095$ |
| Max. at 220-221 mμ | $E_{1cm}^{1\%} = 1160$ |
| Inflex. towards 227 mμ | $E_{1cm}^{1\%} = 930$ |
| Max. at 259-260 mμ | $E_{1cm}^{1\%} = 327$ |
| Inflex. towards 269-268 mμ | $E_{1cm}^{1\%} = 223$ |
| Max. at 285 mμ | $E_{1cm}^{1\%} = 38$ |
| Max. at 296 mμ | $E_{1cm}^{1\%} = 27$ |

As far as is known, this compound is not described in the literature.

STEP C: Spiro (cyclohexane-1,1'-indane)-5'-acetic acid 4.75 gm of spiro (cyclohexane-1,1'-indene)-5'-acetic acid were dissolved in 100 cc of ethanol and 2.4 gm of carbon containing 10 percent palladium were added thereto. A current of hydrogen was passed through the mixture for 20 minutes and the mixture was then filtered and distilled to dryness in vacuo. The residue was crystallized from 10 cc of n-pentane at −10° C to obtain 4.10 gm (87 percent yield) of spiro (cyclohexane-1,1'-indane)-5'-acetic acid melting at 75°C. The compound was identical to the same compound produced in Example I.

EXAMPLE IV

Step A: 3'-oxo-5'-methyl spiro (cyclohexane-1,1'-indane)

A mixture of 1.6 gm of 1-(p-tolyl)-cyclohexane acetic acid (prepared as in Step B of Example I) and 16 gm of polyphosphoric acid was heated for 3 hours at 130° C and after cooling to room temperature, 250 cc of an aqueous saturated sodium bicarbonate solution was added to the reaction mixture. The mixture was extracted with methylene chloride and the organic phase was washed with water, dried over magnesium sulfate, filtered and evaporated to dryness. The residue was purified by sublimation at 60° C at a pressure of 0.05 mm Hg to obtain 1.35 gm (92 percent yield) of 3'-oxo-5'-methyl spiro (cyclohexane-1,1'-indane) melting at 54° C.

Analysis: $C_{15}H_{18}O$ ; molecular weight = 214.31
Calculated: % C 84.07 % H 8.47
Found: % C 84.3 % H 8.5

I R. Spectrum:
Presence of C=O at 1,703 cm⁻¹
As far as is known, this compound is not described in the literature.

STEP B: 3'-oxo-5'-bromomethyl spiro (cyclohexane-1,1'-indane)

A mixture of 650 mg of 3'-oxo-5 '-methyl spiro (cyclohexane-1,1'-indane),13 cc of carbon tetrachloride, 600 mg of N-bromo-succinimide and 7 mg of 2,2'-azo-bis-isobutyronitrile was heated to reflux for 1 hour and was then filtered. The filter was washed with 10 cc of carbon tetrachloride and the combined filtrates were washed with water, dried over magnesium sulfate, filtered and distilled to dryness to obtain 900 mg of 3'-oxo-5'-bromomethyl spiro (cyclohexane-1,1'-indane) which was used as is for the next step.

As far as is known, this compound is not described in the literature.

STEP C: 3'-oxo-5'-cyanomethyl spiro (cyclohexane-1,1'-indane)

A mixture of 250 mg of sodium cyanide, 1.5 cc of dioxane and 0.5 cc of water was heated to reflux and then the 900 mg of 3'-oxo-5'-bromomethyl spiro (cyclohexane-1,1'-indane) from the preceding step were added thereto and the mixture was kept at reflux for 11 hours. The mixture was added to ice and 10 cc of water were added thereto. The aqueous phase was extracted with methylene chloride and the methylene chloride phase was washed with water, dried over magnesium sulfate, filtered and distilled to dryness to obtain 800 mg of 3'-oxo-5'-cyanomethyl spiro (cyclohexane-1,1'-indane) which was used as is for the next step.
IR Spectrum:
Presence of C≡N at 2,252 cm⁻¹
As far as is known, this compound is not described in the literature.

STEP D: 3'-oxo spiro (cyclohexane-1,1'-indane) - 5'- acetic acid

A mixture of 800 mg of 3'-oxo-5'-cyanomethyl spiro (cyclohexane-1,1'-indane) obtained in Step C above, 6 cc of ethylene glycol, 0.2 cc of water and 1.2 gm of potassium hydroxide was refluxed for 30 minutes and after cooling, the mixture was added to water and extracted with ether. The ether phase was washed with water and decanted. The combined aqueous phases were acidified to a pH of 1 by addition of 25 cc of a solution of 10 percent hydrochloric acid and were extracted with ether. The ether phase was washed with water, dried over magnesium sulfate, filtered and distilled to dryness. The residue was sublimated at 180° C at a pressure of 0.3 mm Hg and then at a pressure of 0.15 mm Hg and was then dissolve in 5 cc of ether. The ether solution was distilled to dryness and the residue was taken up in 5 cc of isopropyl ether. The resulting solution was iced, and vacuum filtered and the precipitate was washed with isopropyl ether and dried at 85° C to obtain 50 mg of 3'-oxo spiro (cyclohexane-1,1'-indane)-5' acetic acid melting at 114°C.

Analysis: $C_{16}H_{18}O_3$; molecular weight = 258.32
Calculated: %C 74.39 % H 7.02
Found: % C 74.4 % H 6.9
IR Spectrum:
The spectrum was identical to the product obtained in Step F of Example I.

EXAMPLE V

PREPARATION OF 3', 4'-dihydro spiro [cyclohexane-1,1'-(2'H) Naphthalene]-6'-acetic acid STEP A: 1-(p-cyanomethylphenyl)-cyclohexanepropionic acid Five grams of 1-(p-cyanomethyl-phenyl) cyclohexaneacetic acid were dissolved in 50 cc of thionyl chloride and the solution was refluxed for 1 hour with agitation. After cooling slightly, the solution was distilled to dryness in vacuo and the residue was added to 50 cc of benzene and again distilled in vacuo. The residue was dissolved in 50 cc of methylene chloride and then 170 cc of a solution of 24 gm per liter of diazomethane in methylene chloride were added thereto. The mixture was stirred for 30 minutes at 5° C and was distilled in dryness in vacuo. The residue was crystallized from 6 cc of isopropyl ether to obtain 5.4 gm of a diazoketone melting at 90° C.

A suspension of 1.5 gm of silver oxide, 2.5 gm of sodium carbonate and 2 gm of sodium thiosulfate in 50 cc of water was heated to 60° C and the 5.4 gm of product obtained above in solution in 40 cc of dioxane were added thereto. The mixture was stirred for 30 minutes at 63° C and then 1 gm of silver oxide was added thereto in 4 or 5 parts. The mixture was filtered hot and the filter was washed with 100 cc of an aqueous saturated sodium bicarbonate solution. The neutral fraction was removed by extraction with methylene chloride and the methylene chloride phase was washed with 100 cc of IN sodium hydroxide solution. The combined alkaline aqueous phases were acidified by the addition of 22 cc of hydrochloric acid and were then extracted with methylene chloride. The methylene chloride phase was dried over magnesium sulfate and distilled to dryness in vacuo. The residue was crystallized from 5 cc of ether to obtain 2.7 gm of 1-(p-cyanomethyl-phenyl)-cyclohexanepropionic acid melting at 120° C. For analysis, the product was crystallized from hot and cold isopropyl ether and the melting point was unchanged.

Analysis: $C_{17}H_{21}NO_2$; molecular weight = 271.35
Calculated: %C 75.24 %H 7.80 % N 5.16
Found: %C 74.6 – 74.5 %H 7.8–7.9 %N 5.7–5.7
IR Spectrum:
Presence of aromatic, of non conjugated C ≡ N and acid As far as is known, this compound is not described in the literature.

STEP B: 1-(p-carboxymethyl-phenyl)cyclohexanepropionic Acid

A suspension of 2.4 gm of 1-(p-cyanomethyl-phenyl)cyclohexanepropionic acid and 4.8 gm of potassium hydroxide in 24 cc of ethylene glycol and 2.4 cc of water was stirred at 175° C for 1 hour and after cooling, 50 cc of water were added thereto followed by 15 cc of hydrochloric acid. The mixture was extracted with methylene chloride containing 10 percent methanol and the extracts were washed with water which was decanted off. The extracts were then dried over magnesium sulfate and distilled to dryness in vacuo. Two hundred cc of ethyl acetate were added to the residue and the mixture was heated to reflux to effect dissolution of the residue and was then filtered. The filtrate was concentrated to 50 cc and after cooling the precipitate was washed with ethyl acetate, then ether and was dried at 80° C to obtain 2.3 gm of 1-(p-carboxy-methyl-phenyl)cyclohexane propionic acid melting at 200° C. For analysis, the product was crystallized from hot and cold methanol with no change in the melting point.

Analysis: $C_{17}H_{22}O_4$; molecular weight = 290.35
Calculated: %C 70.32 % H 7.64
Found: %C 70.3 % H 7.7

As far as is known, this compound is not described in the literature.

STEP C: 4'-oxo-3'4'-dihydrospiro [cyclohexane-1,1'-(2'-H)-naphthalene]-6'-acetic acid A suspension of 1.8 gm of 1(p-carboxymethylphenyl) cyclohexane propionic acid in 18 gm of polyphosphoric acid was heated at 130°–140° C with stirring under a nitrogen atmosphere for 1 hour and after cooling, 300 cc of water and excess sodium bicarbonate were added thereto. The reaction mixture was extracted with methylene chloride and the extracts were washed with 0.5 N sodium hydroxide, dried over magnesium sulfate, filtered and distilled to dryness to obtain the neutral fraction. The alkaline aqueous phase and the sodium hydroxide wash waters were combined and made acidic with excess hydrochloric acid. The mixture was extracted with methylene chloride and the organic phases were dried over magnesium sulfate, filtered and distilled to obtain an acid fraction. The residue was taken up in 100 cc of refluxing ether and the solution was filtered and distilled to dryness. The residue was crystallized from 3 cc of ether to obtain 740 mg of 4'-oxo-3',4'-dihydro spiro [cyclohexane-1,1'-(2'H)-naphthalene]-6-acetic acid. The product was purified by sublimation at 160°–170° C at 0.2 mm Hg and crystallization from isopropyl ether to obtain the said acid melting at 142° C. For analysis, the product was crystallized from hot and cold isopropyl ether without change of the melting point.

Analysis: $C_{17}H_{20}O_3$; molecular weight = 272.33
Calculated: % C 74.97 % H 7.40
Found: % C 74.8 % H 7.3
I R SPECTRUM:
Presence of carbonyl at 1,711 cm[-1], presence of conjugated ketone at 1,688 and 1,681 cm[-1] and presence of C   C at 1,614 and 1,561 cm[-1]

U.V. Spectrum:

| | |
|---|---|
| Max. at 211–212 mμ | $E_{1cm}^{1\%} = 930$ |
| Max. at 252 mμ | $E_{1cm}^{1\%} = 390$ |
| Max. at 298 mμ | $E_{1cm}^{1\%} = 76$ |

As far as is known, this compound is not described in the literature.

STEP D: 3', 4'-dihydro spiro [cyclohexane-1,1'-(2'H)naphthalene]6'-acetic acid

Three grams of 4 '-oxo-3', 4'-dihydro spiro [cyclohexane-1,1'-(2'H)-naphthalene]-6'-acetic acid were dissolved in 60 cc of acetic acid and 0.3 cc of perchloric acid and after the addition of 3 gm of carbon containing 10 percent palladium, a current of hydrogen was passed therethrough with stirring. The reaction mixture was filtered and 400 cc of water were added thereto followed by 50 cc of an aqueous saturated sodium chloride solution. The mixture was extracted with methylene chloride and methylene chloride extracts were washed with water, then with 0.5 N sodium hydroxide solutions. The alkaline aqueous phases were combined and made acidic with excess hydrochloric acid. The precipitate was extracted with methylene chloride and the organic extracts were washed with water, dried over magnesium sulfate, filtered and distilled to dryness in vacuo. The residue was dissolved in 500 cc of petroleum ether and the solution was filtered, concentrated to 20 cc, iced and vacuum filtered. The precipitate was washed with petroleum ether and dried to obtain 2.45 gm (87 percent yield) of an acid melting at 118° C. For purification, 200 mg of raw acid was crystallized from 40 cc of petroleum ether to obtain 120 mg of 3',40'-dihydro spiro [cyclohexane-1,1'-(2'H)naphthalene]-6'-acetic acid melting at 120° C. For analysis, the product was crystallized from petroleum ether without changing the melting point.

Analysis: $C_{17}H_{22}O_2$; molecular weight = 258.35
Calculated: %C 79.03 % H 8.58
Found: %C 79.1 – 78.9 % H 8.6 – 8.7

U. V. Spectrum:

| | |
|---|---|
| Inflexion towards 261 mμ | $E_{1cm}^{1\%} = 14.3$ |
| Max. at 267 mμ | $E_{1cm}^{1\%} = 21$ |
| Max. at 276 mμ | $E_{1cm}^{1\%} = 22.3$ |

As far as is known, this compound is not described in the literature.

EXAMPLE VI

STEP A: 4'-oxo-3', 4'-dihydro spiro [cyclohexane-1,1'-(2'H)-naphthalene]-6'-acetamide A suspension of 500 mg of 1-(p-cyanomethyl-phenyl)-cyclohexanepropionic acid (obtained as in Step A of Example V) in 5 gm of polyphosphoric acid was heated under a nitrogen atmosphere with stirring at 115° C for 2 hours and after cooling, 100 cc of iced water and an excess of sodium bicarbonate were added thereto. The mixture was extracted with methylene chloride and the organic extracts were washed with 0.5N sodium hydroxide, dried over magnesium sulfate, filtered and distilled to dryness in vacuo. The residue was dissolved in 10 cc of refluxing methylene chloride and isopropyl ether was added thereto. The mixture was concentrated and vacuum filtered and the crystals were washed with isopropyl ether and dried at 80° C to obtain 450 mg (90 percent yield) of raw product. The product was purified by crystallization from hot and cold ethyl acetate to obtain a 60 percent yield of 4'-oxo-3', 4'-dihydro spiro [cyclohexane-1,1'-(2'-H)-naphthalene]6'-acetamide melting at 200° C. For analysis, the product was crystallized from hot and cold methanol without changing the melting point.

ANALYSIS: $C_{17}H_{21}NO_2$ ; molecular weight = 271.35
Calculated: %C 75.24 % H 7.8 %N 5.16
Found: %C 75.3 % H 7.9 %N 5.5

UV Spectrum:

| | |
|---|---|
| Max. at 211 mμ | $E_{1cm}^{1\%} = 952$ |
| Max. at 251 mμ | $E_{1cm}^{1\%} = 396$ |
| Max. at 298 mμ | $E_{1cm}^{1\%} = 77$ |

IR SPECTRUM:
Presence of NH at 3,511 and 3,399 cm[116 1]; presence of carbonyl at 1,689 and 1,682 cm[116 1]; presence of aromatic at 1,611, 1,588 and 1,581 cm[116 1]

As far as is known, this compound is not described in the literature.

STEP B: 4'-oxo-3', 4'-dihydro spiro [cyclohexane-1,1'-(2'H)-naphthalene]- 6' - acetic acid Four hundred and thirty mg of 4'-oxo-3',4'-dihydro spiro [cyclohexane-1,1'-(2'H)-naphthalene]-6'-acetamide were dissolved in 860 cc of potassium hydroxide in 4.3 cc of ethylene glycol and 0.2 cc of water and the solution was stirred for 1 hour at 150° C. After cooling, 40 cc of water were added and the mixture was extracted with methylene chloride. After decanting, the alkaline phase was acidified by the addition of 2 cc of hydrochloric acid and was then extracted with methylene chloride. The extracts were dried over magnesium sulfate, filtered and distilled to dryness. The residue was crystallized from 3 cc of isopropyl ether to obtain 360 mg (80 percent yield) of raw product which was purified by crystallization from hot and cold ether to obtain an 80 percent crystallization of 4'-oxo-3',4'-dihydro spiro [cyclohexane-1,1'-(2'H)-naphthalene]-6'-acetic acid identical to the product of Step C of Example V.

EXAMPLE VII

PREPARATION OF dl-α-methyl spiro (cyclohexane-1,1'-indane)-5'-acetic acid
STEP A:

3.45 gm of spiro (cyclohexane-1,1'-indane)-5'-acetic acid were dissolved in 10 cc of methylene chloride and after cool-ing to 3° C, 40 cc of a methylene chloride solution containing 20 gm per liter of diazomethane were added thereto. The mixture was stirred for 30 minutes at room temperature and then was distilled to dryness in vacuo to obtain 3.80 gm of methyl spiro (cyclohexane-1,1'-indane)-5'-acetate.

21.4 cc of a 0.66 M solution of butyl lithium in hexane were added to a mixture of 20 cc of hexaphosphortriamide and 20 cc of tetrahydrofuran containing 5 percent of diethylamine at −40° C. While keeping the temperature at −40° C, a solution of 3.80 gm of methyl spiro (cyclohexane-1,1'-indane)-5'-acetate in 7 cc of hexaphosphortriamide and 7 cc of tetrahydrofuran was added to the reaction mixture which was then stirred for 10 minutes at −40° C. 2.53 cc of methyl iodide were added thereto and the mixture was stirred for 10 minutes at −30° C and the temperature was then returned to room temperature. The mixture was added to water and was extracted with ether. The ether phase was washed with water, dried over magnesium sulfate, filtered and distilled to dryness in vacuo to obtain 4 gm of dl methyl α-methyl spiro (cyclohexane-1,1'-indane)-5'-acetate.

4 gm of the said ester were dissolved in 40 cc of ethanol, 4 cc of water and 4 cc of sodium hydroxide solution and the mixture was stirred at reflux for one hour and the mixture was then cooled. The mixture was concentrated under vacuum to 20 cc and then 100 cc of water were added and the mixture was extracted with methylene chloride. The alkaline aqueous phase was acidified by the addition of 6 cc of hydrochloric acid and was extracted with methylene chloride. The said organic phase was dried over magnesium sulfate, filtered and evaporated to dryness in vacuo. The residue was crystallized from 5 cc of n-pentane to obtain 2.8 gm of raw product melting at 108° C which was purified by crystallization from hot and cold n-pentane to obtain 2.4 gm of dl α-methyl spiro (cyclohexane-1,1'-indane)-5'-acetic acid melting at 110° C. For analysis, the product was crystallized from hot and cold isopropyl ether without change of its melting point.
Analysis: $C_{17}H_{22}O_2$; molecular weight = 258.35
Calculated: % C 79.03 % H 8.58
Found: % C 78.9 % H 8.6

U. V. Spectrum (ethanol):

| | |
|---|---|
| Inflexion towards 215 mμ | $E_{1cm}^{1\%} = 354$ |
| Inflex. towards 255 mμ | $E_{1cm}^{1\%} = 20$ |
| Max. at 262–263 mμ | $E_{1cm}^{1\%} = 37$ |
| Max. at 268 mμ | $E_{1cm}^{1\%} = 54$ |
| Max. at 276 mμ | $E_{1cm}^{1\%} = 68$ |

As far as is known, this compound is not described in the literature.

In an analogous manner, dl α-methyl spiro (cyclohexane-1, 1'-(2'H)-naphthalene)-6'-acetic acid was prepared from spiro [cyclohexane-1,1'-(2'H)-naphthalene]-6'-acetic acid and as far as is known, the said product is not described in the literature.

EXAMPLE VIII

PREPARATION OF spiro (cyclohexane-1,1'-indane)-7'-chloro-5'acetic acid

STEP A: ethyl α-cyano-1-(o-chloro-p-methylphenyl)cyclohexane 0.81 gm of magnesium shavings in 5 cc of ether were introduced to a 2-neck balloon flask and then 2.5 gm of 4-bromo-3-chlorotoluene were added thereto. Attack of the magnesium is started by slight heating and the addition of a few drops of dibromoethane and then a solution of 4.40 gm of 4-bromo-3-chlorotoluene in 20 cc of ether was added dropwise to the reaction mixture. The attacking reaction took 3 hours to obtain a magnesium solution titrating 0.9 moles per liter. A solution of 5 gm of ethyl cyclohexylidene-cyanacetate dissolved in 5 cc of ether were added to magnesium solution cooled to 0° C and the reaction temperature was held below 10° C. The thick mixture formed was stirred for 3 ½ hours at room temperature and the complex of addition was decomposed by the addition of a saturated ammonium chloride solution and the aqueous phase was extracted 3 times with ether. The combined ether phase was washed with a salt solution, dried over magnesium sulfate and evaporated to dryness to obtain 9.5 gm of residue. The raw residue was taken up in 5 cc of essence G and the solution was iced and crystallization was started. The crystals were recovered by filtration and were washed 3 times with essence G to obtain 2.3 gm of ethyl α-cyano-1-(o-chloro-p-methylphenyl)-cyclohexaneacetate melting at 83° C. For analysis, 500 mg of the product were recrystallized from hot and cold essence G to obtain a product melting at 85° C.

Analysis: $C_{18}H_{22}NO_2Cl$; molecular weight = 319.83
Calculated: % C 67.60 % H 6.93 % N 4.38 % Cl 11.08
Found: % C 67.3 % H 7.0 % N 4.5 11.1

RMN Spectrum (deuterochloroform):
5 protons at 54-61.5-68.5-228-235-242-249.5Hz corresponding
to -CO$_2$CH$_2$CH$_3$
3 protons at 138 Hz corresponding to C$_6$H$_3$—CH$_3$
8 protons of a saturated ring at 70 to 130 Hz
1 proton at 275 Hz (non-coupled methine)
3 aromatic protons at 420 and 445 Hz As far as is known, this compound is not described in the literature.

STEP B: 1-(o-chloro-p-methylphenyl)-cyclohexaneacetic acid

Two grams of potassium hydroxide, 1 cc of water then 20 cc of ethylene glycol and 2.77 gm of ethyl α-cyano-1-(o-chloro-p-methylphenyl) cyclohexaneacetate were added under an inert atmosphere to a balloon flask with 3 necks and the reaction mixture was refluxed for 17 hours. After cooling, the reaction mixture was diluted with water and was extracted three times with ether. The aqueous phase was acidified with 6 N hydrochloric acid until strongly acidic and was then extracted three times with methylene chloride. The combined methylene chloride phases were washed with salt water, dried over magnesium sulfate, filtered and evaporated to dryness to obtain 2.2 gm (95 percent yield) of raw acid. The acid was crystallized from 20 cc of essence B for a 90 percent yield of 1-(o-chloro-p-methylphenyl)-cyclohexaneacetic acid melting at 110° C. Another crystallization did not change the melting point.

Analysis: $C_{15}H_{19}O_2Cl$; molecular weight = 266.77
Calculated: %C 67.53 %H 7.18 % CL 13.29
Found: %C 67.6 %H 7.0 % Cl 13.0

RMN Spectrum (deuterochloroform):
8 protons of cyclohexane at about 87 Hz
3 protons at 135 Hz (p-tolyl)
2 protons at 178.5 Hz (CH$_2$ in a chain)
Aromatic protons at 412 and 440 Hz
Acid proton at 635 Hz As far as is known, this compound is not described in the literature.

STEP C: 1-(o-chloro-p-bromomethylphenyl)cyclohexane acetic acid 4.5 gm of 1-(o-chloro-p-methylphenyl)cyclohexaneacetic acid, 45 cc of carbon tetrachloride, 3.37 gm of N-bromosuccinimide and 45 mg of azo-bis-isobutyronitrile were added successively to a 100 cc balloon flask and the reaction mixture was refluxed for 2 ½ hours. After cooling, the precipitated succinimide was removed and washed twice with carbon tetrachloride. The combined organic phases were distilled to dryness to obtain the theoretical yield of raw bromomethyl derivative. The raw product was empasted with 20 cc of hot essence B and after cooling, the crystals were filtered and vacuum filtered to obtain 4.80 gm (80% yield) of 1-(o-chloro-p-bromomethylphenyl)cyclohexane acetic acid melting at 137°–138° C. Another crystallization from isopropyl ether gave a product melting at 140° C and a second crystallization from a mixture of equal volumes of isopropyl ether and essence B gave a product melting at 146° C. The product occurred as colorless crystals soluble in carbon tetrachloride and chloroform.

Analysis: $C_{15}H_{18}O_2BrCl$; molecular weight = 345.67
Calculated: %C 52.12 %H 5.25 % Br 23.12 % Cl 10.26
Found: %C 51.9 %H 5.3 % Br 23.3 % Cl 10.0

As far as is known, this product is not described in the literature.

STEP D: 7'-chloro-5'-bromomethyl-3'-oxo spiro (cyclohexane-1,1'-indane

A suspension of 65 gm of polyphosphoric acid (titrating 84% P$_2$O$_5$) and 6.35 gm of 1-(o-chloro-p-bromomethylphenyl) cyclohexaneacetic acid under a nitrogen atmosphere was heated to 95°–100° C in an oil bath for 2 ½ hours with strong stirring. After cooling, 200 cc of water were added in small portions to the reaction mixture while holding the flask in an ice bath. The mixture was stirred in order to dissolve the products and was then extracted with methylene chloride The combined methylene chloride phase were washed with a 10 percent solution of sodium carbonate, then with salt water, dried over magnesium sulfate filtered and evaporated to dryness to obtain 5.7 gm of raw 7'-chloro-5'-bromomethyl-3'-oxo spiro (cyclohexane-1,1'-indane). The product was purified by crystallization from 25 cc of boiling isopropyl ether and cooling to recover a first crop of 2.37 gm of product melting at 128° C. The mother liquor was subjected to chromatography over silica gel and elution with a mixture of benzene-ethyl acetate (98–2) to obtain a second crop of 1.3 gm of 7'-chloro-5'-bromo methyl-3'-oxo spiro (cyclohexane-1,1'-indane) for a total yield of 61 percent. For analysis, the product was crystallized from isopropyl ether and it had a melting point of 132° C. The product occurred as slightly yellow crystals soluble in chloroform and slightly soluble in isopropyl ether.

Analysis: $C_{15}H_{16}BrClO$; molecular weight = 327.66
Calculated: % C 54.98 % H 4.92 % Br 24.39 % Cl 10.82
Found: % C 55.3 % H 4.8 % Br 24.6 % Cl 10.5
IR Spectrum ($CCl_4$)
Carbonyl at 1,707 cm$^{-1}$
Aromatic at 1,608 and 1,558 cm$^{-1}$
RMN Spectrum (deuterochloroform)
$CH_2$ of indane moiety at 160 Hz
Benzyl $CH_2$ at 268 Hz
Aromatic protons at 449 Hz
Presence of aliphatic protons As far as is known, this compound is not described in the literature.

STEP E: 7'-chloro-3'-oxo spiro (cyclohexane-1,1'-indane)-5'-acetonitrile

Six hundred milligrams of sodium cyanide and 4 cc of water, then 16 cc of dioxane and finally 1.966 gm of 7'-chloro-5'-bromo-methyl-3'oxo spiro (cyclohexane-1,1'-indane) were successively added to a 3-necked flask and the mixture was then refluxed for 1 hour. After cooling to room temperature, the mixture was added to 100 cc of water and was extracted three times with methylene chloride. The organic phases were washed with salt water, dried over magnesium sulfate and evaporated to dryness. The residue of 1.72 gm of raw product was purified by dissolution in 50 cc of boiling ethanol which was then iced. The insoluble residue recovered was washed twice with 2 cc of iced ethanol and the ethanol was removed by distillation to obtain 1.52 gm (92 percent yield) of purified 7'-chloro-3'-oxo spiro (cyclohexane-1,1'-indane) 5'-acetonitrile melting at 119° C. Crystallization from isopropyl ether gave an analytical sample melting at 129° C.

The product occurred as colorless crystals soluble in chloroform and ethanol and slightly soluble in isopropyl ether.

Analysis: $C_{16}H_{16}ClNO$; molecular weight = 273.76
Calculated: % Cl 12.95 % N 5.12
Found: % Cl 12.8–13.1 % N 4.9
IR Spectrum:(chloroform)
Cyano group at 2,251 cm$^{-1}$
carbonyl band at about 1,718 cm$^{-1}$
presence of aromatic at 1,614 and 1,561 cm$^{-1}$
RMN spectrum (deuterochloroform):
benzyl methylene at 226 Hz As far as is known, this compound is not described in the literature.

STEP F: 7'-chloro-3'-oxo spiro (cyclohexane-1,1'-indane)-5'-acetic acid

A mixture of 3 cc of water, 3 cc of pure sulfuric acid, 3 cc of acetic acid and 755 mg of 7'-chloro-3'-oxo spiro (cyclohexane-1,1'-indane)-5'-acetonitrile was heated at 110° C for 4 hours and after cooling, the reaction mixture was added to 50 cc of water. The acid formed was precipitated out by the addition of sodium chloride and the aqueous phase was extracted 3 times with methylene chloride. The combined methylene chloride phases were washed with salt water, dried and evaporated to dryness to obtain 671 mg (83 percent yield) of raw product. The said product was empasted with isopropyl ether to obtain 7'-chloro-3'-oxo spiro (cyclohexane-1,1'-indane)-5'-acetic acid melting at 156° C. The product occurred as colorless crystals soluble in chloroform.

Analysis: $C_{16}H_{17}ClO_3$; molecular weight = 292.76

Calculated: % Cl 12.11
Found: % Cl 12.0–12.1
IR Spectrum (Chloroform):
Presence of acid, carbonyl and aromatic
RMN Spectrum (deuterochloroform):
double absorption at 457 Hz ± 2 indicating a meta linking to aromatic protons.
Absorption at 222 Hz (methylene proton)
Absorption at 594 Hz (acid proton)
Absorption at 160 Hz (α-methylene to carbonyl)

As far as is known, this compound is not described in the literature.

STEP G: Spiro (cyclohexane-1,1'-indane)-7'-chloro-5'-acetic acid

Two hundred ninety-three grams of 7'-chloro-3'-oxo spiro (cyclohexane-1,1'-indane)-5'-acetic acid, 3 cc of ethylene glycol and then 180 mg of potassium hydroxide and 0.135 cc of hydrazine hydrate were added to a small flask and the mixture was stirred at room temperature to obtain a homogenous solution. The mixture was heated in progressive steps to 195°–200° C and the mixture was kept at this temperature by heating for 3 ½ hours. After cooling, 100 cc of water were added to the reaction mixture and the aqueous phase was acidified with 6 N hydrochloric acid. The free acid was extracted with methylene chloride and the organic phase was washed with salt water, dried and distilled to dryness to obtain 0.239 gm (85 percent yield) of spiro (cyclohexane-1,1'-indane)-7'-chloro-5'-acetic acid. The raw product was purified by crystallization from 8 cc of boiling essence G concentration to half its volume and cooling. The recovered crystals were washed twice with 1 cc of iced essence G to obtain 150 mg of the said acid melting at 118° C. The product occurred as colorless crystals soluble in chloroform and slightly soluble in essence G.

I R Spectrum (chloroform):
Carbonyl at 1,708 cm$^{-1}$ and aromatic at 1,608 and 1,550 cm$^{-1}$
RMN Spectrum (deuterochloroform)
Principal Lines:
Cyclohexyl at 75 and 110 Hz; 115 Hz, 122 Hz, 129 Hz triplet of methylene α-to cyclohexyl; 163 Hz, 170 Hz, 178 Hz triplet of other methylene of cyclopentane ring; 213 Hz benzyl methylene proton; 421 Hz 2 aromatic protons; and 571 Hz acid proton.
Analysis: $C_{16}H_{19}ClO_2$; molecular weight = 278.78
Calculated: %C 68.93 %H 6.87 % Cl 12.72
Found: %C 68.6 %H 6.9 % Cl 12.9

As far as is known, this compound is not described in the literature. Using the analogous process beginning with the appropriate 3 substituted 4-bromo toluene, there were obtained spiro(cyclohexane-1, 1'-indane)-7'-methoxy-5'-acetic acid; spiro (cyclohexane-1,1'-indane)-7'-trifluoromethyl-5'-acetic acid; and spiro (cyclohexane-1,1'-indane)-7'- ethoxy-5'-acetic acid.

As far as is known, these compounds are not described in the literature.

EXAMPLE IX

PREPARATION OF 2,3,5,6-tetrahydro spiro (thiapyran-4,1'-indane)-5'-acetic acid

STEP A: 4-(p-acetylphenyl)-2,3,5,6-tetrahydrothiapyran-4-acetic acid 4.86 gm of magnesium were added under an inert atmosphere to 25 cc of tetrahydrofuran and 0.5 cc of dibromoethane. After the magnesium attack and when the temperature reached 35° C, a solution of 48.4 gm of 2-p-bromophenyl-2-methyl-1,3-dioxolane[described by Fuegas, Bull. Soc. Chim., (1963) p. 2579] in 485 cc of anhydrous tetrahydrofuran were added over 2 ¼ hours while keeping the temperature at 37° C. The mixture is then stirred for 1 ½ hour at 37° C.

When the temperature was lowered to 28° C, a solution of 29.54 gm of ethyl 4-tetrahydrothiapyranylidene cyanacetate in 80 cc of anhydrous tetrahydrofuran was added thereto over 30 minutes without exceeding 38° C. The solution was stirred for 16 hours at room temperature and was then concentrated to dryness under reduced pressure. The residue was added to a mixture of ice, aqueous hydrochloric acid and ether and stirred and the organic phase was decanted off. The aqueous phase was extracted with ether and the ether phases were washed successively with an aqueous 2N hydrochloric acid solution, with water, with aqueous sodium bicarbonate solution and then with water, was treated with animal charcoal and evaporated to dryness under reduced pressure to obtain 62.1 gm of raw residue A which was used as is for the next step.

The 62.1 gm of residue A were dissolved under an inert atmosphere in 150 cc of ethylene glycol and a solution of 60 gm of potassium hydroxide in 60 cc of ether and 210 cc of ethylene glycol was added thereto. The mixture was stirred for 24 hours in a bath heated to 140° C while capturing the freed ammonia in an aqueous 2N hydrochloric acid solution (to use about 60.7 cc of solution for the 70 cc theoretical). The mixture was cooled and poured into a mixture of ice-water and the aqueous phase was extracted with ether. The ether extracts were washed with water and the wash water was added to the principal aqueous phase. The aqueous phase was acidified to a pH of 1 by addition of aqueous hydrochloric acid solution and was extracted with methylene chloride. The combined methylene chloride extracts were washed with water and the acid formed was extracted with an aqueous sodium bicarbonate solution. The aqueous alkaline extracts were washed with methylene chloride and the acid was precipitated by the addition of an aqueous hydrochloric acid solution. The precipitate was removed by vacuum filtration, was washed with water and dried to obtain 28.84 gm of raw 4-(p-acetylphenyl)-2,3,5,6-tetrahydrothiapyran-4-acetic acid which was used as is for the next step. A sample of the product, after crystallization from benzene, melted at 167° C.

Analysis: $C_{15}H_{18}O_3S$; molecular weight = 278.35
Calculated: %C 64.72 % H 6.52 % S 11.52
Found: %C 65.0 % H 6.6 % S 11.8

As far as is known, this compound is not described in the literature.

STEP B: 4-(p-morpholinothiocarbonyl methylphenyl)-2,3,5,6-tetrahydrothiapyran-4-acetic acid A mixture of 33.95 gm of raw 4-(p-acetylphenyl)-2,3,5,6-tetrahydrothiapyran-4-acetic acid, 7.85 gm of precipitated sulfur, 0.6 gm of p-toluene sulfonic acid and 145 cc of anhydrous morpholine was heated in a bath under an inert atmosphere for 16 hours with stirring at 140° C and after cooling the reaction mixture was poured into ice and acidified to a pH of 1 by the addition of an aqueous hydrochloric acid solution. The formed precipitate was recovered by vacuum filtration and was washed with water. The precipitate was dissolved in methanol and the solution was refluxed and then cooled to 5° C and held there for 1 hour. The precipitate was recovered by vacuum filtration, was washed and dried to obtain 25.9 gm of raw 4-(p-morpholinothiocarbonylmethylphenyl)-2,3,5,6-tetrahydrothiapyran-4-acetic acid melting at 160° C which was used as is for the next step. A sample of the product after crystallization from methanol, melted at 178° C.

Analysis: $C_{19}H_{15}NO_3S_2$; molecular weight = 379.52
Calculated: %C 60.13 % H 6.64 % N 3.69 % O 12.65 % S 16.89
Found: %C 59.5 % H 6.8 % N 4.2 % O 13.1 % S 16.3

As far as is known, this compound is not described in the literature.

STEP C: 4-(p-carboxymethylphenyl)-2,3,5,6-tetrahydrothiapyran-4-acetic acid.

25.9 gm of the raw product from Step B and 25.9 gm of potassium hydroxide were added under an inert atmosphere to 500 cc of ethanol and the mixture was refluxed with stirring for 15 hours and was then cooled. The solvent was distilled off under reduced pressure and the residue was added to water and the mixture was filtered to remove slight insoluble precipitate. The filtrate was acidified to a pH of 1 by the addition of an aqueous hydrochloric acid solution and the acid aqueous phase was then extracted with methylene chloride. The methylene chloride extracts were washed with water, dried, treated with carbon black, stirred and filtered. After concentration to dryness by distillation under reduced pressure, the residue was crystallized from benzene after passage through carbon back to obtain 13.06 gm of 4-(p-carboxymethylphenyl)-2,3,5,6-tetrahydrothiapyran-4-acetic acid melting at 146° C.

Analysis: $C_{15}H_{18}O_4S$; molecular weight = 294.35
Calculated: %C 61.2 % H 6.16 % S 10.89
Found: %C 61.1 % H 6.3 % S 10.7

As far as is known, this compound is not described in the literature.

STEP D: 3'-oxo-2,3,5,6-tetrahydro spiro (thiapyran-4,1'-indane)-5'-acetic acid

A mixture of 9.41 gm of 4-(p-carboxymethylphenyl)-2,3,5,6-tetrahydrothiapyran-4-acetic acid and 188 gm of polyphosphoric acid (83 percent phosphoric anhydride) was heated with agitation at 115° C for 1 ½ hours and after cooling, the mixture was poured into ice. The mixture was stirred and then was extracted with ethyl acetate. The combined organic extracts were washed with water, dried, treated with carbon black, stirred and filtered. The filtrate was concentrated to dryness by distillation under reduced pressure and the residue was crystallized from toluene to obtain 5.82 gm of 3'-oxo-2,3,5,6-tetrahydro spiro (thiapyran-4,1'-indane)-5'-acetic acid melting at 160° C.

Analysis: $C_{15}H_{16}O_3S$; molecular weight = 276.34
Calculated: %C 65.19 % H 5.84 % S 11.60
Found: %C 65.1 % H 5.8 % S 11.5

As far as is known, this product is not described in the literature.

STEP E: 2,3,5,6-tetrahydrospiro (thiapyran-4,1'-indane)-5'-acetic acid

A mixture of 4.81 gm of 3'-oxo-2,3,5,6-tetrahydro spiro (thiapyran-4,1'-indane)-5'-acetic acid, 5 cc of hydrazine hydrate, 3.4 cc of water, 3.4 gm of potassium hydroxide and 70 cc of ethyleneglycol was stirred under an inert atmosphere and heated to 197° C in 35 minutes while distilling off 25 cc of liquid. The distillation system was replaced with an ascending refrigerant and the mixture was held at reflux for 4 hours. After cooling, the mixture was poured into a water-ice mixture and was extracted with ethyl ether. The ether extracts were washed with water and the combined wash waters and principal aqueous phase were acidified to a pH of 1 by addition of aqueous hydrochloric acid solution. The mixture was stirred and the resulting precipitate was recovered by vacuum filtration, was washed and dried to obtain 4.265 gm of 2,3,5,6-tetrahydro spiro (thiapyran-4,1′-indane)-5′-acetic acid melting at 132° C. Crystallization from cyclohexane did not change the melting point of the product.

Analysis: $C_{15}H_{18}O_2S$; molecular weight = 262.35
Calculated: %C 68.67 %H 6.91 % S 12.22
Found: %C 68.7 %H 7.0 % S 11.9
RMN Spectrum (deuterochloroform):

Peaks at 105-109-117-127 Hz(hydrogens of β-$CH_2$ to S and β-$CH_2$ to phenyl); at 142-156-159.5-164 Hz (hydrogens of $CH_2$ of

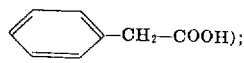

at 427 Hz (aromatic hydrogens); and at 647 Hz (hydrogen of carboxyl).

As far as is known, this compound is not described in the literature.

EXAMPLE X

PREPARATION OF dl α-methyl-2,3,5,6-tetrahydro spiro (thia-pyran-4,1′-indane)-5′-acetic acid 4.38 gm of 2,3,5,6-tetrahydro spiro (thiapyran-4,1′-indane)-5′-acetic acid were dissolved in 50 cc of methylene chloride and 70 cc of a methylene chloride solution containing 11 gm per liter of diazomethane were added to the solution and stirring was continued for 30 minutes. The mixture was concentrated to dryness by distillation under reduced pressure to obtain 4.7 gm of the corresponding methyl ester (A) of the starting acid.

A mixture of 1.22 gm of diethylamine, 25 cc of hexamethyl phosphortriamide and 25 cc of tetrahydrofuran under an inert atmosphere was cooled to −40° C and 20.1 cc of 0.83 N solution of butyl lithium in hexane was added all at once. After stirring for 5 minutes, a solution of methyl ester (A) in 8cc of hexamethylphosphortriamide and 8 cc of tetrahydrofuran was added all at once at −40° C and the mixture was stirred for 5 minutes. Then, 6.99 gm of methyl iodide were added all at once and the mixture was stirred for 30 minutes at −35° C and was then removed from the cooling bath. The mixture was stirred for another 25 minutes and then was added to a water-ice mixture. The aqueous phase was extracted with ether and the ether extracts were washed with water, dried, treated with carbon black, stirred, filtered and concentrated to dryness by distillation under reduced pressure to obtain product B.

Product B was added under an inert atmosphere to a mixture of 5 cc of water, 5 cc of an aqueous 40°Be′ sodium hydroxyde and 50 cc of methanol and the reaction mixture was heated at reflux for 30 minutes. The mixture was added to water and the methanol was distilled off under reduced pressure and water was added. The aqueous phase was extracted with ether and the ether extracts were washed with water. The wash water and principal aqueous alkaline phase were combined and acidified to a pH of 1 by addition of an aqueous hydrochloric acid solution. After cooling, the precipitate formed was recovered by vacuum filtration, was washed with water, and dried. The product was crystallized from methanol after treatment with carbon black to obtain 3.44 gm of dl α-methyl-2,3,5,6-tetrahydro spiro (thiapyran4,1′-indane)-5′-acetic acid melting at 134° C. Concentration of the methanolic mother liquors gave a second crop of 0.28 gm of product melting at 134° C.

Analysis: $C_{16}H_{20}O_2S$; molecular weight = 276.38
Calculated: %C 69.53 % H 7.29 % S 11.60
Found: %C 69.2 % H 7.3 % S 11.5
RMN Spectrum (deuterochloroform)

Peaks at 85–92 Hz (methyl hydrogens); at 105–124 Hz (hydrogens of $CH_2$ β to S and of $CH_2$ β to phenyl); at 152–179 Hz (hydrogens of $CH_2$ α to S and $CH_2$ α to phenyl); at 211–218–225–232.5 Hz (hydrogens α to carboxyl); at 428.5 Hz (aromatic hydrogens); and at 640 Hz (hydrogen of carboxyl).

As far as is known, this compound is not described in the literature.

EXAMPLE XI

PREPARATION OF 2,3,5,6-tetrahydro spiro (pyran-4,1′-indane)-5′-acetic acid

STEP A: Ethyl 4-tetrahydropyranylidene cyanacetate

A mixture of 85 cc of ethyl cyanacetate, 7.5 gm of ammonium acetate, 22 cc of acetic acid and 250 cc of benzene was heated to reflux in a system adapted for azeotropic distillation to remove the water of reaction formed and maintaining reflux and ozeotropic distillation for 3 hours to obtain 83.5 gm of ethyl 4-tetrahydropyranylidene cyanacetate boiling at 108°–11 0° C at 0.6 mm Hg.

Analysis:
Calculated: % C 61.52 % H 6.71 % N 7.18
Found: % C 61.4 % H 6.5 % N 7.5

STEP B: 4-(p-acetylphenyl)-2,3,5,6-tetrahydropyran-4-acetic acid

Using the procedure of Example IX, ethyl 4-tetrahydropyranylidene cyanacetate was condensed with diethylene ketal of 4-acetylphenyl magnesium bromide followed by alkaline treatment to obtain 4-(p-acetylphenyl)-2,3,5,6-tetrahydropyran-4- acetic acid melting at 134° C.

As far as is known, this product is not described in the literature.

STEP C: 4-(p-morpholinothiocarbonylmethylphenyl)-2,3,5,6-tetrahydropyran-4-acetic acid A mixture of 2.63 gm of 4-(p-acetylphenyl)-2,3,5,6-tetrahydropyran-4-acetic acid, 0.64 gm of precipitated sulfur, 12 cc of anhydrous morpholine and 0.050 gm of p-toluene sulfonic acid under a nitrogen atmosphere was refluxed for 18 hours and was then cooled and poured into a water-ice mixture. The slight precipitate formed was recovered by filtration and the filtrate was acidified to a pH of 3 by the addition of an aqueous solution of hydrochloric acid. The mixture was stirred and the precipitate formed was recovered by vacuum filtration, was washed with water and then methanol and dried to obtain 2.65 gm of raw 4-(p-morpholinothiocarbonylmethylphenyl)-2,3,5,6-tetrahydropyran-4-acetic acid melting at about 190° C. (not clear) which was used as is for the next step. A sample of the product, after crystallization from methanol, melted at 191°C.

Analysis: $C_{19}H_{25}NO_4S$; molecular weight = 363.46
Calculated: %C 62.78 % H 6.93 % N 3.84 % S 8.62
Found: %C 62.7 % H 6.8 % N 4.0 % S 8.7

As far as is known, this compound is not described in the literature.

STEP D: 4-(p-carboxymethylphenyl)-2,3,5,6-tetrahydropyran4-acetic acid.

2.4 gm of potassium hydroxyde and 2.4 gm of raw 4-(p-morpholinothiocarbonylmethylphenyl)-2,3,5,6-tetra-hydropyran-4-acetic acid were dissolved in 48 cc of ethanol and the solution was heated at reflux for 16 hours and then was cooled. The mixture was concentrated to dryness by distillation under reduced pressure and the residue was added to water. The slight precipitate was removed by filtration and the filtrate was acidified to a pH of 3 by addition of an aqueous solution of hydrochloric acid. The gum formed was extracted with ethyl acetate and the organic solution was dried and added to carbon black and stirred. The carbon black was removed by filtration and the filtrate was concentrated to dryness by distillation under reduced pressure to obtain 1.8 gm of raw 4-(p-carboxymethylphenyl)-2,3,5,6-tetrahydropyran-4-acetic acid which was used as is for the next step.

As far as is known, this compound is not described in the literature.

STEP E: 3'-oxo-2,3,5,6-tetrahydrospiro (pyran-4,1'-indane)-5'-acetic acid

Twenty grams of polyphosphoric acid (84 percent phosphoric anhydride) was heated under an inert atmosphere to 115° C and 2 gm of raw 4-(p-carboxymethylphenyl)-2,3,5,6-tetrahydropyran-4-acetic acid were added thereto and the mixture was stirred for 1 ½ hours at 115° C. The solution was cooled and added to a mixture of ice and water and the gum formed was extracted with ethyl acetate. The organic solution was washed with water, dried and concentrated to dryness by distillation under reduced pressure and the residue was taken up in methylene chloride. The resulting solution was treated with carbon black and concentrated to dryness by distillation under reduced pressure to obtain 1.47 gm of raw 3'-oxo-2,3,5,6-tetrahydro spiro (pyran-4,1'-indane)-5'-acetic acid which was used as is for the next step.

As far as is known, this compound is not described in the literature.

STEP F: 2,3,5,6-tetrahydro spiro (pyran-4,1'-indane)-5'-acetic acid 2.05 gm of 3'-oxo-2,3,5,6-tetrahydro spiro (pyran-4,1'-indane)-5'-acetic acid dissolved in 40 cc of acetic acid were introduced in a hydrogenation apparatus and 2 gm of palladized carbon containing 10 percent palladium and then 0.4 cc of an aqueous solution of 67 percent perchloric acid were added thereto. The apparatus was charged with hydrogen and stirred. In 2 hours, 400 cc of hydrogen (355 cc theory) were absorbed. The catalyst was removed by filtration and the filtrate was distilled to dryness under reduced pressure. The residue was added to ethyl ether and water and the ether phase was decanted off and was washed with water, then with an aqueous solution of sodium bicarbonate. The alkaline solution was acidified to a pH of 3 by addition of aqueous solution of hydrochloric acid and the precipitate was recovered by vacuum filtration, washed with water and dried to obtain 1.9 gm of 2,3,5,6-tetrahydro spiro (pyran-4,1'-indane)-5'-acetic acid melting at 110° C. A sample of the product after crystallization from cyclohexane melted at 112° C.

Analysis: $C_{15}H_{18}O_3$; molecular weight = 246.29
Calculated: %C 73.84 % H 7.37
Found: %C 72.8 % H 7.5

RMN Spectrum (deuterochloroform):
Peaks at 78 and 132 Hz (various protons); at 167–174–181 Hz (hydrogens of $CH_2$ α to phenyl); at 204 to 250 Hz (hydrogens of $CH_2$ α to oxygen); at 216.5 Hz (hydrogens of $CH_2$ α to phenyl and (OOH); and at 628 Hz (hydrogen of carboxy).

As far as is known, this compound is not described in the literature.

EXAMPLE XII

PREPARATION OF dl α-methyl-2,3,5,6-tetrahydro spiro(pyran-4,1'-indane)-5'-acetic acid.

2.84 gm of 2,3,5,6-tetrahydro spiro (pyran-4,1'-indane)- 5'-acetic acid were dissolved in 25 cc of methylene chloride and a methylene chloride solution of diazomethane was added thereto dropwise until a yellow coloration persisted. The mixture was stirred for 10 minutes and then a few drops of acetic acid were added until decoloration occurred. The mixture was evaporated to dryness by distillation under reduced pressure and the methyl ester formed was dissolved in a mixture of 2.5 cc of tetrahydrofuran and 2.5 cc of hexamethylphosphorotriamide to obtain solution A.

A mixture of 26 cc of tetrahydrofuran, 26 cc of hexamethyl phosphorotriamide and 1.11 cc of diethylamine cooled to –40° C was held under an inert atmosphere and then 13.2 cc of a solution of 0.83 moles per liter of butyl lithium in hexane was rapidly added thereto followed by the addition of solution A. 2 cc of methyl iodide were added to the reaction mixture cooled to –35° C and after the temperature returned to 20° C, the mixture was stirred for 30 minutes at 20° C. The mixture was then poured into water and the aqueous phase was extracted with ether. The ether phase was washed with water, dried and concentrated to dryness by distillation under reduced pressure.

The resulting residue was added to a mixture of 50 cc of methanol, 15 cc of water and 10 cc of aqueous 2 N sodium hydroxide and the reaction mixture was heated at 80° C for 30 minutes. The methanol was removed by distillation under slight vacuum and the mixture was added to water. The mixture was treated with carbon black, was filtered and adjusted a pH of 3 by the addition of aqueous hydrochloric acid. The mixture was cooled to 5° C and the precipitate formed was recovered by vacuum filtration and was washed with water to obtain 2.12 gm of dl α-methyl-2,3,5,6--tetrahydrospiro (pyran-4,1' -indane)-5'-acetic acid melting at 161° C. A sample was crystallized from cyclohexane without change of the melting point.

Analysis: $C_{16}H_{20}O_3$; molecular weight = 260.32
Calculated: % C 73.82 % H 7.74

Found: % C 73.7 % H 8.0
RMN Spectrum (deuterochloroform):
Peaks at 86–93 Hz (hydrogens of $CH_3-CH{<}$);

at 100 to 132 Hz (hydrogens of $CH_2$ $\beta$ to oxygen); at 118.5–125.5C:132.5 Hz and 167–174–181 Hz (hydrogens of $CH_2$ of pentagonal ring); at 204–250 Hz (hydrogens of $CH_2$ $\alpha$- to oxygen and proton $\alpha$ to carbonyl); at 430 Hz (hydrogens of aromatic ring); and at 630 Hz (hydrogen of carboxyl).

As far as is known, this compound is not described in the literature.

EXAMPLE XIII

PREPARATION OF 4-(p-carboxymethylphenyl)-2,3,5,6-tetrahydropyran-4-acetic acid
Step A: ethyl $\alpha$-cyano-4-(p-methylphenyl)-2,3,5,6-tetrahydropyran-4-acetate One hundred and twenty cubic centimeters of a solution of 0.88 moles per liter of p-tolyl magnesium bromide in ether were added under an inert atmosphere over 45 minutes to a solution of 19.5 gm of ethyl 4-tetrahydropyranylidene cyanacetate (of example XI) in 100 cc of ether and the mixture was refluxed for 2 hours. After hydrolysis of the magnesium intermediate derivative, 28 gm of ethyl $\alpha$-cyano-4-(p-methylphenyl)-2,3,5,6-tetrahydropyran-4-acetate melting at 100° C were obtained. A sample of the product, purified by crystallization from ethanol, melted at 102° C.
Analysis:
Calculated: % C 71.05 % H 7.37 % N 4.8
Found: % C 71.1 % H 7.4 % N 5.1

As far as is known, this product is not described in the literature.
STEP B: 4-(p-methylphenyl)-2,3,5,6-tetrahydropyran-4-acetic acid 25.4 gm of ethyl $\alpha$-cyano-4-(p-methylphenyl)-2,3,5,6-tetrahydropyran-4-acetate were added to a mixture of 25 gm of potassium hydroxide, 25 cc of water and 150 cc of glycol and the mixture was refluxed for 24 hours while recovering 83/85 of the theoretical amount of ammonia. The mixture was added to an ice-water mixture, was filtered and acidified with an aqueous hydrochloric acid solution. The precipitate formed was recovered by vacuum filtration, washed and dried to obtain 16.5 gm of 4-(p-methylphenyl)-2,3,5,6-tetrahydropyran-4-acetic acid melting at 130° C. Crystallization from isopropyl ether did not change the melting point.
Analysis:
Calculated: % C 71.77 % H 7.74
Found: % C 71.8 % H 7.7

As far as is known, this compound is not described in the literature.
STEP C: 4-(p-bromomethylphenyl)-2,3,5,6-tetrahydropyran-4-acetic acid A mixture of 9.5 gm of 4-(p-methylphenyl)-tetrahydropyran-4-acetic acid, 95 cc of carbon tetrachloride, 8.3 gm of N-bromosuccinimide and 0.250 g of 2,2'-azo-bis-(2-methylpropionitrile) was heated slowly under an inert atmosphere and after the exothermic reaction started, reflux was maintained for 45 minutes. After cooling and filtering the reaction mixture, the filtrate was evaporated to dryness by distillation under reduced pressure and the residue was added to isopropyl ether. The precipitate formed was recovered by vacuum filtration, was washed and dried to obtain 10.65 gm of 4-(p-bromomethylphenyl)-2,3,5,6-tetrahydropyran-4-acetic acid. A sample was crystallized from isopropyl ether and melted at 127° C.
Analysis:
Calculated: % C 53.69 % H 5.47 % Br 25.52
Found: % C 53.2 % H 5.3 % Br 26.9

As far as is known, this compound is not described in the literature.
Step D: 4-(p-cyanomethylphenyl)-2,3,5,6-tetrahydropyran-4-acetic acid A mixture of 4.5 gm of potassium cyanide, 7 cc of water and 25 cc of dioxane was heated under an inert atmosphere to 100° C and then 9.5 gm of 4-(p-bromomethylphenyl)-2,3,5,6-tetrahydropyran-4-acetic acid were added to the solution over 30 minutes. The mixture was refluxed for 30 minutes, cooled and added to water. The aqueous phase was extracted with methylene chloride and the organic phase was washed, dried and concentrated to dryness under reduced pressure to obtain 7.45 gm of 4-(p-cyanomethylphenyl)-2,3,5,6-tetrahydropyran-4-acetic acid which was used as is for the next step.

As far as is known, this compound is not described in the literature.
STEP E: 4-(p-carboxymethylphenyl)-2,3,5,6-tetrahydropyrah-4-acetic acid.

Six grams of the raw cyano derivative produced in Step D were added under an inert atmosphere to a mixture of 60 cc of ethylene glycol, 3 cc of water and 12 gm of potassium hydroxide and the reaction mixture was heated for one hour in a bath regulated at 250° C and after treatment, there were obtained 5.4 gm of raw 4-(p-carboxymethylphenyl)-2,3,5,6-tetrahydropyran-4-acetic acid which was identical to the product of Step D of Example XI.

PHARMACOLOGICAL STUDY

A. Anti-inflammatory Activity

The test used was that of Branceni et al. slightly modified (Arch. Int. Pharmacodyn, Vol. 152 (1964), p. 15) wherein a single injection of 1 mg of naphtoyl-heparamine (NHA) was administered to the plantary aponeurosis of the rear paw of rats weighing about 150 gm which injection was intended to provoke an inflammatory osdema. The test compound, dl $\alpha$-methyl spiro (cyclohexane-1,1'-indane)-5'-acetic acid, was orally administered in an aqueous suspension one hour before the injection.

The inflammation was determined by electric plethysmometric measurement of the paw volume immediately before and 2 hours after the NHA injection. The increase in volume of the paw was measured twice to obtain the degree of inflammation and the mean degree of inflammation of each group was expressed in absolute values and as a percent of control animals. Under these conditions, the active standard dose sufficient to numerically express the activity of a product is the $DA_{40}$ or the dose which diminishes the degree of inflammation by 40 percent of that of the controls. The results are shown in Table I.

TABLE I

| PRODUCT | Dose in γ/Kg | Increase in paw Volume in 2 Hours | % of Protection |
|---|---|---|---|
| Controls | 0 | 30.3 | 0 |
| dl α-methyl spiro cyclohexane-1,1'-indane)-5' acetic acid | 100 | 27.4 | 9 |
|  | 250 | 16.6 | 45 |
|  | 500 | 17.9 | 41 |

The test results show that the anti-inflammatory activity of the tested compound is very important and that its $DA_{40}$ is about 350γ/Kg. The $DA_{40}$ is about 10 mg/Kg for phenylbutazone and 30 to 60 mg/Kg for aspirin under the same experimental conditions.

B. Analgesic Activity

The test employed was based on the fact noted by Koster et al. (Fed. Proc., (1959)180 412) according to which the intraperitoneal injection of acetic acid provoked repeated characteristic movements of stretching and twisting persisting in mice for more than 6 hours. Analgesics prevent or suppress this syndrome which is an exterior manifestation of a diffuse abdominal pain.

A solution of 6 parts per thousand of acetic acid in water containing 10 percent of arabic gum was employed and the dose releasing the syndrome in mice under these conditions was 0.01 cc./gm., being 60 mg./kg. of acetic acid. The analgesics were administered orally to groups of five mice, which had not been fed for 24 hours, a half hour before the intraperitoneal injection of the acetic acid. The stretchings were observed, noted and counted for each mouse and then additionally by groups of five, during a period of observation of fifteen minutes immediately after the injection of acetic acid. The average number of stretchings observed on the control groups of five mice during the period of observation was determined. The test compound was administered in various doses in aqueous suspension. The results are shown in Table II.

TABLE II

|  | dlα-methyl spiro(cyclohexane-1,1'-indane)-5'-acetic acid | | | | | |
|---|---|---|---|---|---|---|
| Doses in mg/kg | 1 | 2 | 5 | 10 | 20 | 50 |
| Number of stretchings as % of controls | 76 | 62 | 45 | 36 | 25 | 6 |

Table II shows that $DA_{50}$ dose for the test compound is 4 mg/kg while the $DA_{50}$ for aspirin under the same conditions is 160 mg/kg.

C. Ulcerigenic Activity

The ulcerigenic activity was determined by a test inspired by Boissier et al [Ther Vol. 22 (1967), p. 157]. Female rats between 120 to 140 gm were starved for 24 hours before the test and the test product was orally administered in aqueous suspension at a volume of 0.4 cc per 100 gm of animal and at varying doses. The animals were killed seven hours later or 31 hours after the start of starvation and the stomachs were removed. The importance of ulcerous lesions was determined for each stomach, and taking into account the number and size thereof, rated on a scale of 0 TO 3. The results are shown in Table III.

TABLE III

|  | Dose in mg/kg | Scale of 0 to 3 |
|---|---|---|
| Control | 0 | 0.20 |
| dlα-methyl spiro(cyclohexane-1,1'-indane)-5'-acetic acid | 20 | 1.38 |

Under the test conditions the test product had a very slight ulcerigenic activity at the dose of 20 mg/kg.

Various modifications of the products and process of the invention may be made without departing from the spirit or scope thereof and it is to be understood that the invention is intended to be limited only as defined in the appended claims.

We claim:

1. A compound selected from the group consisting of spiro benzocyclane acetic acid compounds of the formula

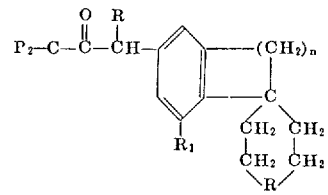

wherein R is selected from the group consisting of hydrogen and linear and branched alkyl of one to four carbon atoms, $R_1$ is selected from the group consisting of hydrogen, chlorine, trifluoromethyl and lower alkoxy, Y is selected from the group consisting of methylene, oxygen and sulfur, n is 2, 3 or 4 and $R_2$ is selected from the group consisting of hydrogen, alkyl of one to six carbon atoms, 2,3-dihydroxy-propyl, 2,2-dimethyl-1,3-dioxolan-4-yl and cation of non-toxic, pharmaceutically acceptable mineral and organic bases.

2. A compound of claim 1 wherein $R_1$ is hydrogen and Y is methylene.

3. A compound of claim 1 wherein R is alkyl of 1 to 4 carbon atoms in its racemic or optically active form.

4. A compound of claim 1 which is spiro (cyclohexane-1,1'-indane)-5'-acetic acid.

5. A compound of claim 1 which is dl α-methyl spiro(cyclohexane-1,1'-indane)-5'-acetic acid.

6. A compound of claim 1 which is 3', 4'-dihydro spiro [cyclohexane-1,1'-(2'H)-naphthalene]-6'-acetic acid.

7. A compound of claim 1 which is dl α-methyl-3',4'-dihydro spiro [cyclohexane-1,1'-(2'H)-naphthalene]-6'-acetic acid.

8. A compound of claim 1 which is 2, 3, 5, 6-tetrahydro spiro (pran-4,1'-indane)-5'-acetic acid.

9. A compound of claim 1 which is dl α-methyl-2, 3, 5, 6-tetrahydro spiro (pyran-4,1'-indane)-5'-acetic acid.

10. A compound of claim 1 which is 2, 3, 5, 6-tetrahydro spiro (thiapyran-4,1'-indane)-5'-acetic acid.

11. A compound of claim 1 which is dl α-methyl-2, 3, 5, 6-tetrahydro spiro (thiapypan-4,1'-indane)-5'-acetic acid.

12. A compound of claim 1 which is spiro(cyclohexane-1,1'-indane)-7'-chloro-5'-acetic acid.

13. A compound of claim 1 wherein Y is selected from the group consisting of methylene and oxygen.

14. A compound of claim 13 wherein R is alkyl of 1 to 4 carbon atoms in its racemic or optically active form.

* * * * *